United States Patent [19]

Klatt

[11] Patent Number: 4,690,008
[45] Date of Patent: Sep. 1, 1987

[54] GEARSHIFT RANGE PRECONDITIONING SYSTEM

[75] Inventor: Alfred Klatt, Wathlingen, Fed. Rep. of Germany

[73] Assignee: WABCO Westinghouse Fahrzeugbremsen GmbH, Hanover, Fed. Rep. of Germany

[21] Appl. No.: 763,741

[22] Filed: Aug. 8, 1985

[30] Foreign Application Priority Data

Aug. 10, 1984 [DE] Fed. Rep. of Germany ....... 3429531

[51] Int. Cl.$^4$ ............................................. F16H 5/42
[52] U.S. Cl. .................................... 74/336 R; 74/866
[58] Field of Search ................... 74/335, 336 R, 745, 74/752 D, 866; 364/424.1

[56] References Cited

U.S. PATENT DOCUMENTS

| 2,637,222 | 5/1953 | Backus | 74/745 |
| 2,654,268 | 10/1953 | Perkins | 74/745 |
| 3,407,676 | 10/1968 | Magg | 74/745 |
| 3,945,265 | 3/1976 | Bell et al. | 74/745 |
| 4,203,375 | 5/1980 | Miller | 74/745 |
| 4,388,843 | 6/1983 | Teeter | 74/745 |
| 4,467,427 | 8/1984 | Magnusson | 364/424.1 |
| 4,507,736 | 3/1985 | Klatt | 364/424.1 |
| 4,539,868 | 9/1985 | Habu | 74/866 |
| 4,621,328 | 11/1986 | Arai et al. | 74/335 X |

Primary Examiner—Leslie Braun
Assistant Examiner—David Novais
Attorney, Agent, or Firm—G. E. Hawranko

[57] ABSTRACT

A gearshift range preconditioning system includes a gearshift device which, when manually-operated to effect a gear-change, initiates a signal to an electronic logic circuit which is coupled to the vehicle to receive vehicle-operating characteristics such as speed and engine RPMs. The electronic logic circuit evaluates this change request and the received operating characteristics in relation to predetermined optimum operating characteristics associated with optimum neutral gear ranges. The electronic logic unit then generates a neutral gear signal which is transmitted to a solenoid-valve-controlled neutral gear cylinder to effect operation of the vehicle transmission into the neutral position best suited for the specific vehicle-operating characteristics. An auxiliary range cylinder can effect selection of active gear positions between a high and a low state to achieve a doubling of possible active gear positions.

15 Claims, 3 Drawing Figures

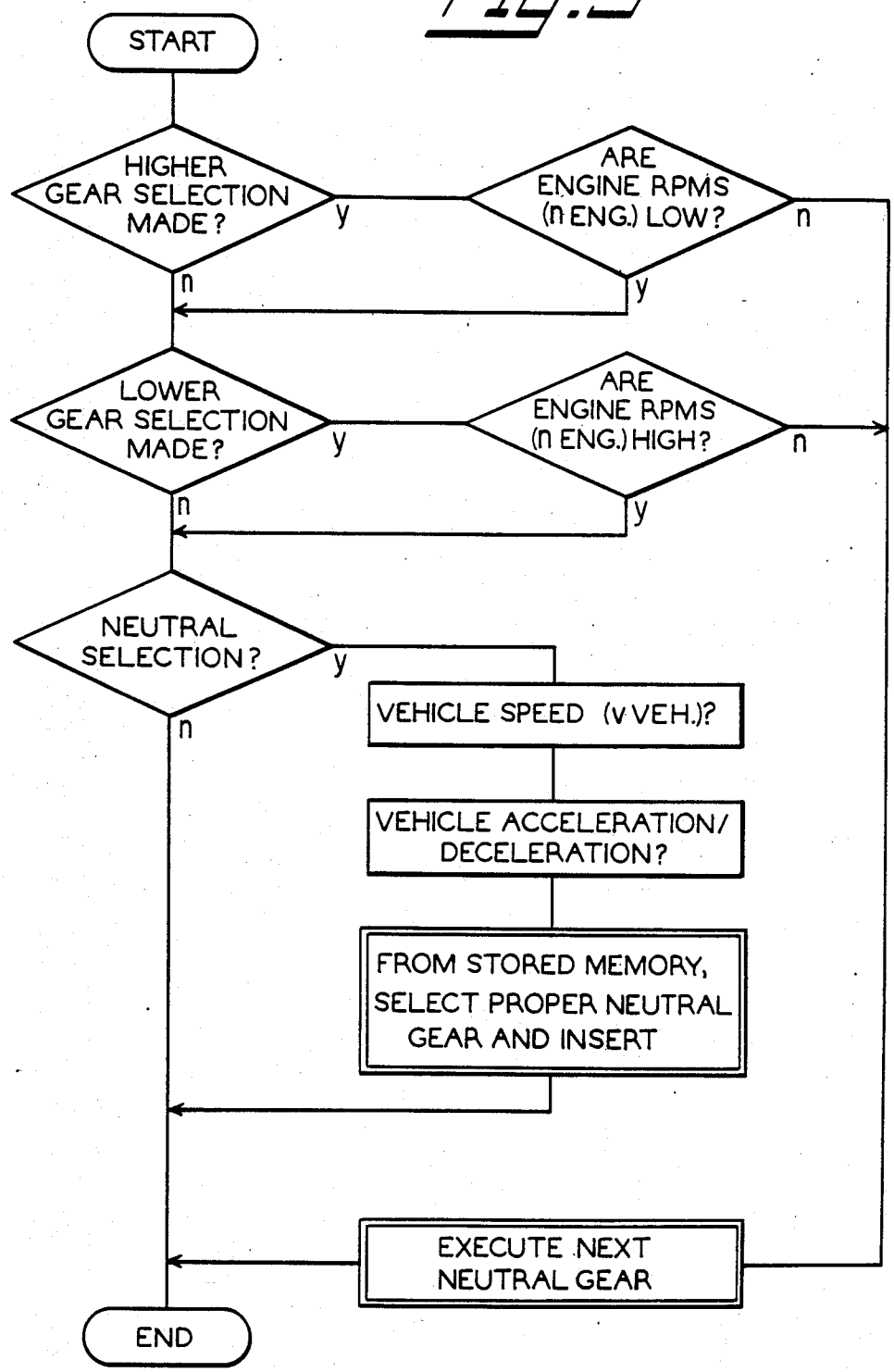

GEARSHIFT RANGE PRECONDITIONING SYSTEM

BACKGROUND OF THE INVENTION

This invention relates to a vehicle transmission having a gearshift range preconditioning system, which can be particularly advantageous in vehicles with a need for quick shifting time and mantaining shifting accuracy.

In vehicles having typical power-assisted semiautomatic or fully automatic transmission for conventional synchromesh-type transmissions, there are several neutral positions. To facilitate automatic gear selections in such transmissions, one neutral selection system and one active gear selection system are provided. During a gear-change operation, these two systems are shifted in a prescribed sequence and in such a way that any one gear allows the immediate selection of any other gear.

Presently known gearshift conditioning arrangements typically include an electronic logic portion which prohibits the selection of a specific gear only if an inadmissible rate of engine revolutions were existent. One gearshift control arrangement, which provides for a conditioning of the gearshift lever depending on similar vehicle performance criteria, can be found in the U.S. patent application Ser. No. 348,038, which is assigned to the assignee of the present invention and which has matured into U.S. Pat. No. 4,507,736.

This system, however, is directed more toward an inline-type gear-selecting arrangement, which does not have a plurality of neutral range positions generally associated with a H-type gearshift arrangement. To accomplish the actual shifting operation, the vehicle transmission system typically includes fluid-pressure-actuated operating cylinders which assist in shifting to a neutral position from any gear, and from a neutral position to any gear. In the case of a neutral selection being initiated through a transmitter, which is controlled by the vehicle operator, it is not determinable to which neutral range within the transmission that the actually-engaged neutral gear is assigned; this range possibly could be between the lower gears, the higher gears, or even adjacent the reverse gear. Normally, the cylinder controlling the neutral position operates such that the neutral gear remains in the neutral range nearest the previously-selected active gear. This arrangement has the disadvantage that, now, if starting from a certain neutral position of the transmission, a gear selected which is not within the same neutral range in which the neutral position had been situated, then the new neutral range must first be selected. Under certain driving conditions, this creates a delay resulting in the total shifting time of the transmission. If, for instance, the vehicle is started from a standstill position, and if the engaged neutral range happens to not be situated adjacent the active gear used for starting the vehicle, a first neutral range change must occur. The same rule applies when a vehicle operator (while the vehicle is moving) shifts first only into the neutral range, and then allows the vehicle to roll for a distance before shifting into the necessary active gear; in this instance, a first neutral range shift must also occur.

Such undetermined selection of passive neutral ranges may additionally entail a safety risk with respect to the accuracy of the shifting operation. In the previously-described instance of the vehicle rolling while in an undetermined neutral range, access to the reverse gear may be inadvertently achieved with equipment damage resulting therefrom.

SUMMARY OF THE INVENTION

It is, therefore, an object of the invention to provide a gearshift range preconditioning system for vehicle transmissions which positions the transmission to the neutral range nearest the active gear best suited for the vehicle under certain vehicle-operating conditions.

It is a further object of the invention to provide such a gearshift range preconditioning system, which utilizes engine RPM and vehicle speed information to determine the optimum neutral range into which the gearshift should be preconditioned.

Still a further object of the invention is to provide such a gearshift range preconditioning system which has the additional safety feature of preventing accidental shifting into the reverse gear during forward motion of the vehicle.

An even further object of the invention is to provide a gearshift range preconditioning system which provides for a timely, accurate, gear-selecting operation and utilizes an electronic logic circuit to accomplish its operation in a fast manner.

Briefly, the invention consists of a vehicle transmission having a main gear portion and an auxiliary gear portion for selecting between a range of high and low active gears. Each transmission portion is actuated by work cylinders which are controlled by way of electromagnetic valves. Two work cylinders are provided within the main gear portion, one for positioning the selected active gear, and one for positioning to the optimum neutral range gear. Electromagnetic valves are actuated by an electronic logic unit which receives information on the vehicle speed and engine RPMs and derives control signals therefrom. A vehicle operator controls a gearshift lever which is connected into the electronic logic unit for processing of the gear selection operation performed by the vehicle operator.

BRIEF DESCRIPTION OF THE DRAWINGS

FIG. 3 is a diagrammatic representation, in flow-chart form, of the system operating sequences for the gearshift range preconditioning system.

DESCRIPTION AND OPERATION

Figure 1:
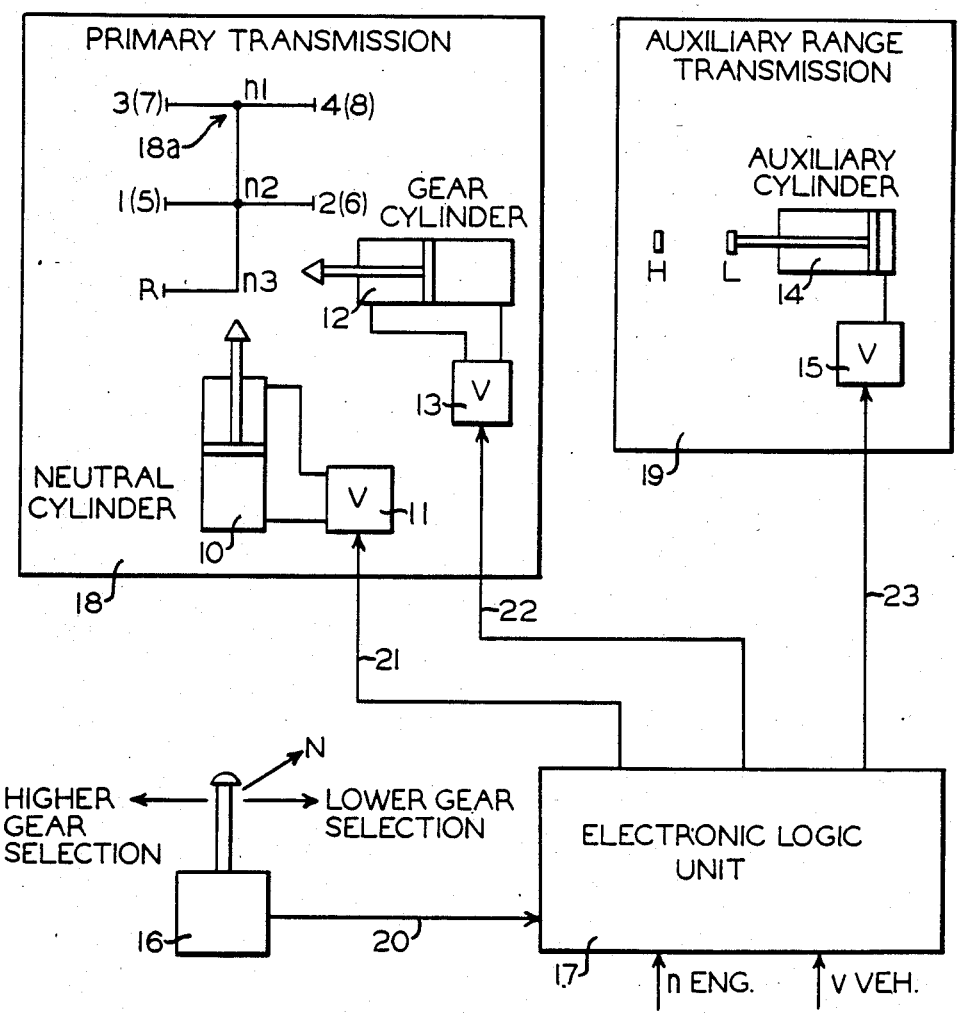
FIG. 1 is an elevational view, in diagrammatic form, of a gearshift range preconditioning system for vehicle transmission constructed in accordance with the invention.

As seen in FIG. 1, a vehicle transmission having a gearshift range preconditioning system includes a primary transmission portion 18 and an auxiliary transmission portion 19, each being shown within the outline in FIG. 1. Within the block representing the primary transmission 18 is shown a typical H-type shifting pattern 18a. This H-type shifting pattern 18a includes four forward gears (1 through 4) and one reverse gear (R), as well as the plurality of neutral gear positions separating the forward gears and separating the lower forward gears from their reverse gear (R). In the shown forward gear position situation, there are three possible neutral positions; however, it can be appreciated that alternate gear pattern arrangements, other than an inline configuration, will also employ a plurality of neutral gear positions which can be assumed between the active forward and reverse gears.

The primary transmission 18 includes a three-position neutral cylinder 10, which effects the actual shifting function into one of the shown three neutral positions n1, n2 or n3. A first valve 11, which may be a solenoid-actuated valve, is connected to the neutral cylinder 10 so that the positioning of the neutral cylinder 10 can be controlled therethrough. A first conductor 21 is coupled to the first valve 11 so that the necessary neutral control signal can be transmitted from an electronic logic unit 17, the characteristics of which will be described hereinafter in further detail. Shifting into the active gears; that is the forward gears and the reverse gear, is achieved by means of a three-position gear cylinder 12 which is of similar construction as the neutral cylinder 10. The gear cylinder 12 is positioned under the control of a second valve 13 which is of the same type as the first valve 11 and which receives a gear control signal over a second conductor 22 also coupled to the electronic logic unit 17.

Disposed adjacent, and working in conjunction with the primary transmission 18, in an auxiliary range transmission 19 which serves to double the number of possible forward gears for the vehicle transmission. The auxiliary range transmission 19 includes a two position auxiliary range cylinder 14. A third valve 15 operates to position the auxiliary range cylinder 14 according to a range signal transmitted over a third conductor 23 which is coupled to the electronic logic unit 17. The auxiliary range cylinder 14 assumes either a low or a high position, which effects selection of the gear range designated by the shift pattern 18a. When the low position (L) is assumed, forward gears 1 through 4 are achieved; and when the high position (H) is assumed, forward gears 5 through 8 can be achieved, which higher gears are shown parenthetically in the shift pattern 18a.

Connected across an input line 20, as an input device to the electronic logic unit 17, is a gear-selecting box 16 which includes a gear-selecting lever 16a manually operable by the vehicle operator. The gear-selecting lever 16a can be operated into one of three positions shown by arrow representation in FIG. 1 as "higher gear", "lower gear", or "neutral". The electronic logic unit 17, in addition to receiving this gear-selection signal input from the gear box 16, receives input signals representing vehicle speed and engine RPMs from vehicle devices typically indicating this information; such devices, for instance, being a tachometer (not shown) and a speedometer (not shown).

The electronic logic unit 17 determines a suitable gear for the vehicle to be in, based on the vehicle characteristics of vehicle speed and engine RPMs as well as the gear-selection signal and the current gear position. The electronic logic unit 17 can perform such a determination through the use of a microcomputer arrangement with the memory and interface devices generally associated therewith. In such an arrangement, the memory devices could store optimum values for the previously-listed vehicle characteristics and compare such values with the measured valves to determine the optimum gear that the vehicle transmission should be moved into. It can be appreciated that the electronic logic unit 17 could also consist of discrete electronic components arranged in a manner to effect the same determination.

The memory capabilities of the electronic logic unit 17 serves to store the information on the relationship between the optimum characteristics for each neutral position, relative to the respective vehicle speed $v_{VEH}$ as depicted in a graphical manner in FIG. 2, the application of which vehicle speed, gear-position relationship will be described hereinfter in further detail.

In operation, the gearshift range preconditioning system is initiated following operation of the gearshift-selection box 16 to one of the three indicated positions. Prior to such initialization, however, the vehicle-operating characteristics of the vehicle speed and engine RPMs can be coupled to the electronic logic unit 17 on an essentially-continuous basis such that, upon the initialization of the change in the gearshift, the most-current information will be available to the electronic logic unit 17. It is also possible that the electronic logic unit 17 can sample for the vehicle speed and engine RPMs on an "as needed" basis as well. Under the essentially continuous information sampling approach, the electronic logic unit can be arranged such that the integrity of the vehicle performance measuring devices can be checked as well.

As seen in FIG. 3, the first conditional inquiry conducted following system initialization is whether a "higher gear selection" has been effected by the vehicle operator. If this condition is satisfied; that is, if the higher gear selection has been made, the gearshift range preconditioning system then evaluates whether or not the engine RPMs are at a low value; and, if this condition is answered in the negative, then the gearshift range preconditioning system executes the desired higher gear selection initiated by the vehicle operator. If the engine RPMs are low, however, following the system initialization by way of the higher gear selection, the gearshift range preconditioning system does not execute a change in the neutral range position but goes on to a second conditional inquiry.

If the response to the first conditional inquiry is negative; that is, if the higher gear-selection signal has not been initiated by the vehicle operator, the gearshift range preconditioning system then effects the second conditional inquiry which examines whether the "lower gear selection" signal has been initiated by the vehicle operator. Similar to the first conditional inquiry, if the lower gear selection has been initiated, the gearshift range preconditioning system then examines whether the engine RPMs are at a high level. If it is determined that the engine RPMs are not at a high, the gearshift range preconditioning system then goes on to execute the lower gear-selection request made by the operator. If it has been determined that the engine RPMs are at a high level following the selection of the lower gear selection, the gearshift range preconditioning system will not execute a neutral range change and will then revert to a third conditional inquiry.

This third conditional inquiry is also assumed if the inquiry into the selection of the "lower gear selection" has been answered in the negative as well. The third conditional inquiry examines whether the neutral gear selection has been initiated by the vehicle operator through the gearshift-selection box 16.

If this third conditional inquiry is answered in the affirmative, the electronic logic unit 17 then looks at the input to the electronic logic unit representing the vehicle speed from which is then determined the vehicle acceleration or deceleration. The electronic logic unit 17 then determines, based on the relationship between the vehicle speed and the optimum neutral gear range, the optimum neutral gear range in which the vehicle transmission should be preconditioned as depicted in the graphical representation of FIG. 3. If, for instance, the vehicle moves at a rate of speed higher than approximately fifty kilometers per hour in the neutral range, then the neutral position is always taken in the range of the $\frac{7}{8}$ gear position. Within the range of speed of approximately twenty to fifty kilometers per hour, the neutral range before gears 5/6 is taken.

Auxiliary range transmission 19 is shifted at the same stages as the primary transmission 18. At a rate of speed higher than approximately twenty kilometers per hour, this shifting occurs into the high position (H); and at a rate of speed lower than twenty kilometers per hour, the shifting occurs into the low position (L).

The reverse gear (R) can only be engaged within a narrower range close to the vehicle speed of $V_{VEL}=0$. If the reverse gear is disengaged during reverse motion of the vehicle, shown in FIG. 2 as approximately negative seven kilometers per hour, the neutral range before gear $\frac{1}{2}$ is always the one taken.

Figure 2:
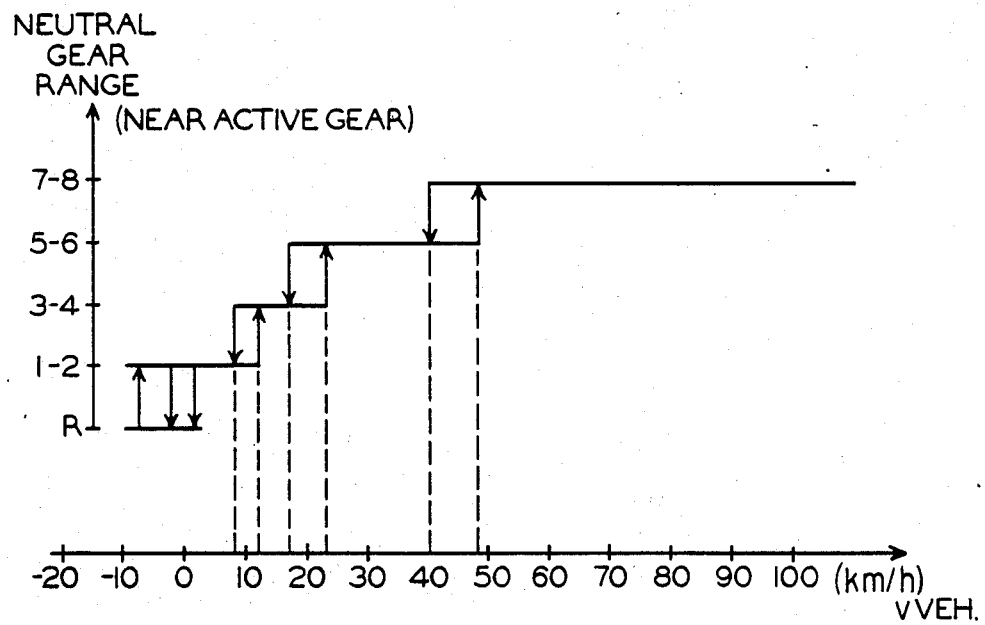
FIG. 2 is a graphical representation of the vehicle speed relative to the plurality of neutral gears obtainable.

FIG. 2 further shows that the shifting into the higher range in neutral positions occurs at a higher rate of vehicle speed than does shifting into the lower neutral ranges. This differential is due to a desire to prevent a constant change of ranges of a certain rate of vehicle speed.

When the vehicle is started from a stationary position, electronic logic unit 17 always engages the neutral range before the active gears $\frac{1}{2}$ prior to commencing motion. When the vehicle operator wants to start the vehicle, he moves the gearshift lever 16a in a direction "higher gear selection" and electronic logic unit 17 then engages the first gear 1. This results in a time-savings equal to the amount of time which would be necessary for the actuation of the neutral cylinder 10 if the neutral range were situated, for instance, before the active gears $\frac{3}{4}$.

Although the hereinabove form of the invention constitutes a preferred embodiment, it can be appreciated that modifications can be made thereto without departing from the scope of the invention as detailed in the appended claims.

As an example of such a modification, an input to the electronic logic unit 17 can be made designating the vehicle weight as a consideration in determining which neutral range the vehicle should be preconditioned to in relation to the vehicle speed.

Having thus described the invention, what I claim as new and desired to secure by Letters Patent, is:

1. A gearshift range preconditioning system for a vehicle transmission having a plurality of neutral gear positions and a plurality of active gear positions comprising:
   (a) gear-selecting means manually-operable for generating a gear-change signal indicating a request to change to one of the plurality of neutral and active gears;
   (b) electronic control means coupled to said gear-selecting means for receiving such gear-change signal and for receiving vehicle-operating characteristics such as vehicle speed and engine RPMs, said electronic control means further including storage means for storing optimum values of such vehicle-operating characteristics associated with each of the plurality of neutral gear positions, said electronic control means further being effective for generating a neutral control signal representing an optimum neutral gear position as a function of a comparison of such received vehicle-operating characteristics and such optimum values of such vehicle-operating characteristics;
   (c) gear-operating means connected to the vehicle transmission and coupled to said electronic control means for receiving such neutral control signal and effecting operation of the vehicle transmission into such optimum neutral gear position in response thereto; and
   (d) said gear operating means including a neutral gear cylinder positionable to a plurality of positions proportionally corresponding in number to the plurality of neutral gear positions, and a first solenoid valve coupled to said electronic control means and connected to said neutral gear cylinder such that upon reception of such neutral control signal, said first solenoid valve operates to position said neutral gear cylinder into such optimum neutral gear position.

2. A gearshift range preconditioning system, as set forth in claim 1, wherein said electronic control means is further effective for generating a gear control signal in response to initiation of such gear-change signal indicative of a request to change to one of the plurality of active gears.

3. A gearshift range preconditioning system, as set forth in claim 2, wherein said gear-operating means further includes an active gear cylinder positionable to a plurality of positions proportionally corresponding in number to the plurality of active gear positions and a second solenoid valve coupled to said electronic control means and connected to said active gear cylinder such that upon reception of such gear control signal, said second solenoid valve operates to position said active gear cylinder to such requested one of the plurality of active gear positions.

4. A gearshift range preconditioning system as set forth in claim 3, wherein said electronic control means generates such neutral control signal substantially simultaneous to generation of such gear control signal such that operation of said neutral gear cylinder to such optimum neutral gear position and operation of such active gear cylinder to such requested one of the plurality of active gear positions occurs substantially simultaneously and at substantially equivalent speeds.

5. A gearshift range preconditioning system, as set forth in claim 3, wherein said gear-selecting means includes a gear-selecting box and a manually-operable gear-selecting lever.

6. A gearshift range preconditioning system, as set forth in claim 5, wherein said gear-selecting lever is manually-operable to one of a higher gear-selection position, a lower gear selection position, and a neutral gear selection position, and wherein operation into one of such positions results in initiation of such gear change signal.

7. A gearshift range preconditioning system, as set forth in claim 3, further comprising an auxiliary range means connected to said electronic control means and said gear-operating means for conditioning said active gear cylinder into one of a high and a low condition, such high condition of said active gear cylinder corresponding to a proportionate increase in the plurality of active gear positions over the plurality of active gear positions attainable in such low active gear cylinder condition.

8. A gearshift range preconditioning system, as set forth in claim 7, wherein said auxiliary range means includes an auxiliary range cylinder positionable to such high and low conditions, and a third solenoid valve connected to said electronic control means and receptive of an auxiliary range signal generated by said electronic control means such that said auxiliary range cylinder is positioned to one of said high and low conditions in response thereto.

9. A gearshift range preconditioning system, as set forth in claim 8, wherein said gear-selecting means includes a gear-selecting box and a manually-operable gear-selecting lever.

10. A gearshift range preconditioning system, as set forth in claim 9, wherein said gear-selecting lever is manually-operable to one of a higher gear-selection position, a lower gear selection position, and a neutral gear selection position, and wherein operation into one of such positions results in initiation of such gear change signal.

11. A gearshift range preconditioning system, as set forth in claim 1, wherein said electronic control means includes an electronic processing circuit and said storage means includes an electronic memory circuit.

12. A gearshift range preconditioning system, as set forth in claim 1, wherein said electronic control means permits operation of the vehicle transmission into a reverse gear position only when such vehicle-operating characteristic of vehicle speed is declining and at a value approximately equal to zero.

13. A gearshift range preconditioning system, as set forth in claim 1, wherein said electronic control means generates such neutral control signal at an increasingly faster rate as such vehicle-operating characteristics of vehicle speed and engine RPMs increases.

14. A gearshift range preconditioning system, as set forth in claim 1, wherein said gear-selecting means includes a gear-selecting box and a manually-operable gear-selecting lever.

15. A gearshift range preconditioning system, as set forth in claim 14 wherein said gear-selecting lever is manually-operable to one of a higher gear-selection position, a lower gear selection position, and a neutral gear selection position, and wherein operation into one of such positions results in initiation of such gear change signal.

* * * * *